April 9, 1963 B. B. JORDAN 3,084,860

DECIMAL TO BINARY NUMBER TRANSLATING DEVICE

Filed Aug. 4, 1959 2 Sheets-Sheet 1

INVENTOR
B. B. JORDAN
By S. Gundersen
ATTORNEY

INVENTOR
B. B. JORDAN
By S. Gundersen
ATTORNEY 3,084,860

DECIMAL TO BINARY NUMBER TRANSLATING DEVICE

Ben B. Jordan, Watchung, N.J., assignor to Western Electric Company, Incorporated, New York, N.Y., a corporation of New York Filed Aug. 4, 1959, Ser. No. 832,881
2 Claims. (Cl. 235—155)

This invention relates to electrical translation devices and more particularly to a device for translating decimal numbers into binary numbers.

Electronic computers and associated devices generally operate with the binary system of numbers rather than the decimal system. Decimal notation is convenient for calculating machines containing dials or other devices which may take one through ten positions. In the decimal system the number 1,011 equals one 1000, no 100's one 10 and one 1 all added together. The position of the digits gives information as to the powers of the root 10. In computers two position devices having two states, "off" (non-conducting) state and "on" (conducting) state such as relays, diodes and flip-flop circuits of various types, are used in place of ten position dials. The binary number system is particularly adaptable for such two position devices. In binary notation the base is two. The digits, which are zero and one, give information as to the power of the base two. For example, 2 to the zero power is 1; 2 to the first power is 2; 2 to the second power is 4; 2 to the third power is 8, etc. The figure 1,011 in binary notation is 8+0+2+1 and therefore equals 11.

In order to convert a number from decimal notation into the corresponding binary notation it has been necessary to have complex and costly computing devices utilizing electron tubes and other electronic devices not having the reliability possessed by contact devices.

An object of the present invention is a simple and reliable device for converting numbers in decimal notation into binary notation.

A further object is such a device in which the operating parts are electro-mechanical relays.

A yet further object is apparatus for operator enter ing of decimal notation and its conversion into a punched tape in the corresponding binary notation.

In accordance with the present invention a standard decimal keyboard, for example one having positions 1 through 9, 10 through 90, and 100 through 1000, is utilized to convert numbers in decimal notation into binary notation. Upon depressing a key of the decimal keyboard preselected contacts are closed which convert the decimal number into its corresponding binary number. Each key corresponds to a digit of the decimal notation so that each decimal digit is separately converted to its binary equivalent. At the conclusion of the entry of a complete decimal number the operator depresses a switch adding all of the binary numbers to give a binary number equivalent to the complete decimal number.

Further objects will be apparent from the following detailed description and accompanying drawings in which.

Figure 1:
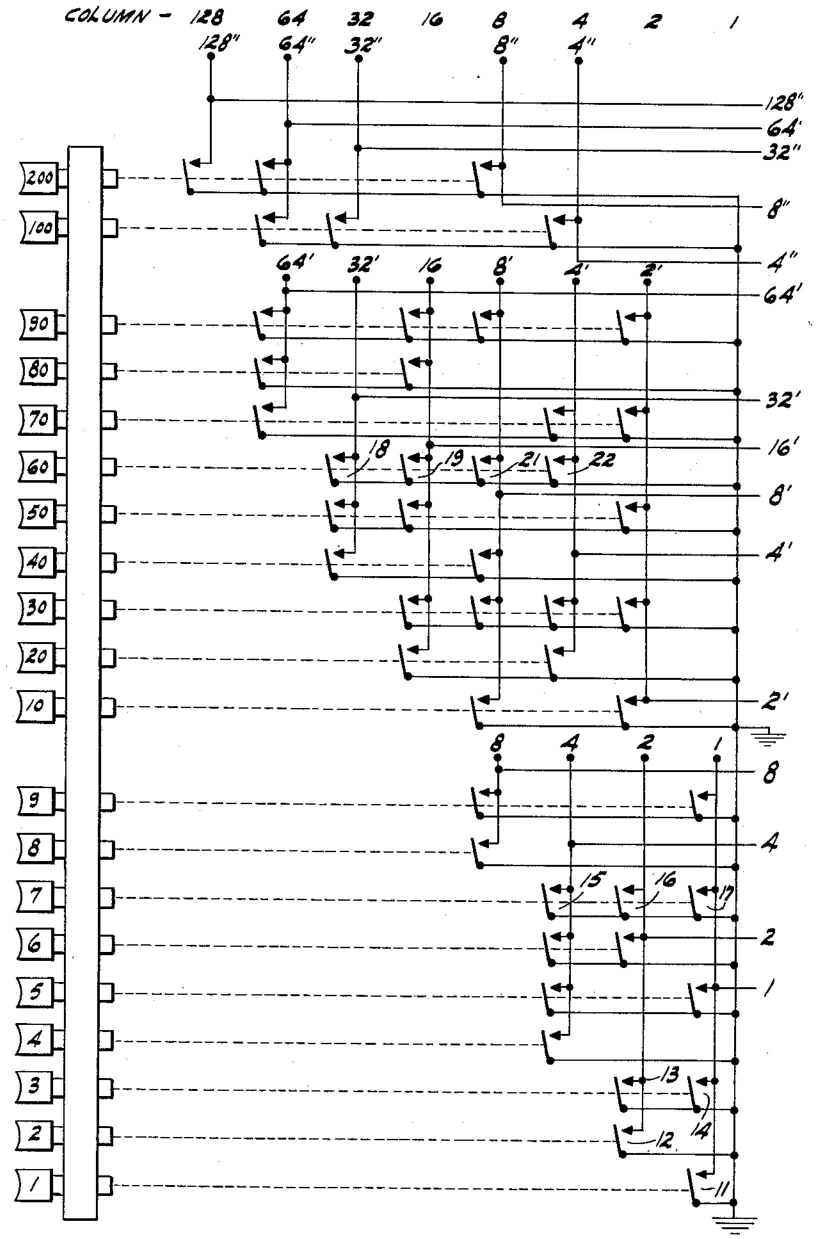
FIG. 1 is a schematic diagram of the decimal keyboard showing contacts operated by the keys.

In FIG. 1, the decimal keyboard has positions for a decimal number up to 300. It will be understood, however, that with additional keys (not shown) higher decimal numbers may be accommodated by the circuit described below.

Each key of the keyboard is numbered with its corresponding decimal notation. For example, key 4 corresponds to the decimal number 4 and key 40 corresponds to the decimal number 40. To enter the number 267 keys 200, 60 and 7 are depressed in any order. The keyboard contact notation is the decimal equivalent to their binary numbers. For example, the decimal equivalent to the binary numbers (and the corresponding contacts) are 1, 2, 4, 8, 16, 32, 64 and 128. Depression of key 1 operates contact 11 in column 1 (binary base two to the zero power or the binary number 00000001). Depression of key 2 operates contact 12 in column 2 (the binary number is 00000010. Depression of key 3 operates contacts 13 and 14 in binary columns 2 and 1 respectively (the binary number is 00000011).

Depression of key 7 operates contacts 15, 16 and 17 in binary columns 4, 2 and 1 (the binary number is 00000111). Examination of the binary number 00000111 shows that there are, counting from the left, zeros in the first five places, the number one representing 4 in the sixth place, the number one representing 2 in the seventh place, and the number one representing 1 in the eighth place. Addition of these numbers 4, 2 and 1 gives the original number of 7. For the tens digit, key 60 operates contacts 18, 19, 21 and 22 which are respectively in the 32, 16, 8 and 4 columns (the binary number is 00111100). By following this scheme any number up to 300 may be manually operated onto the keyboard shown in FIGURE 1 giving pulses in binary form from the contacts.

Figures 2, 3:
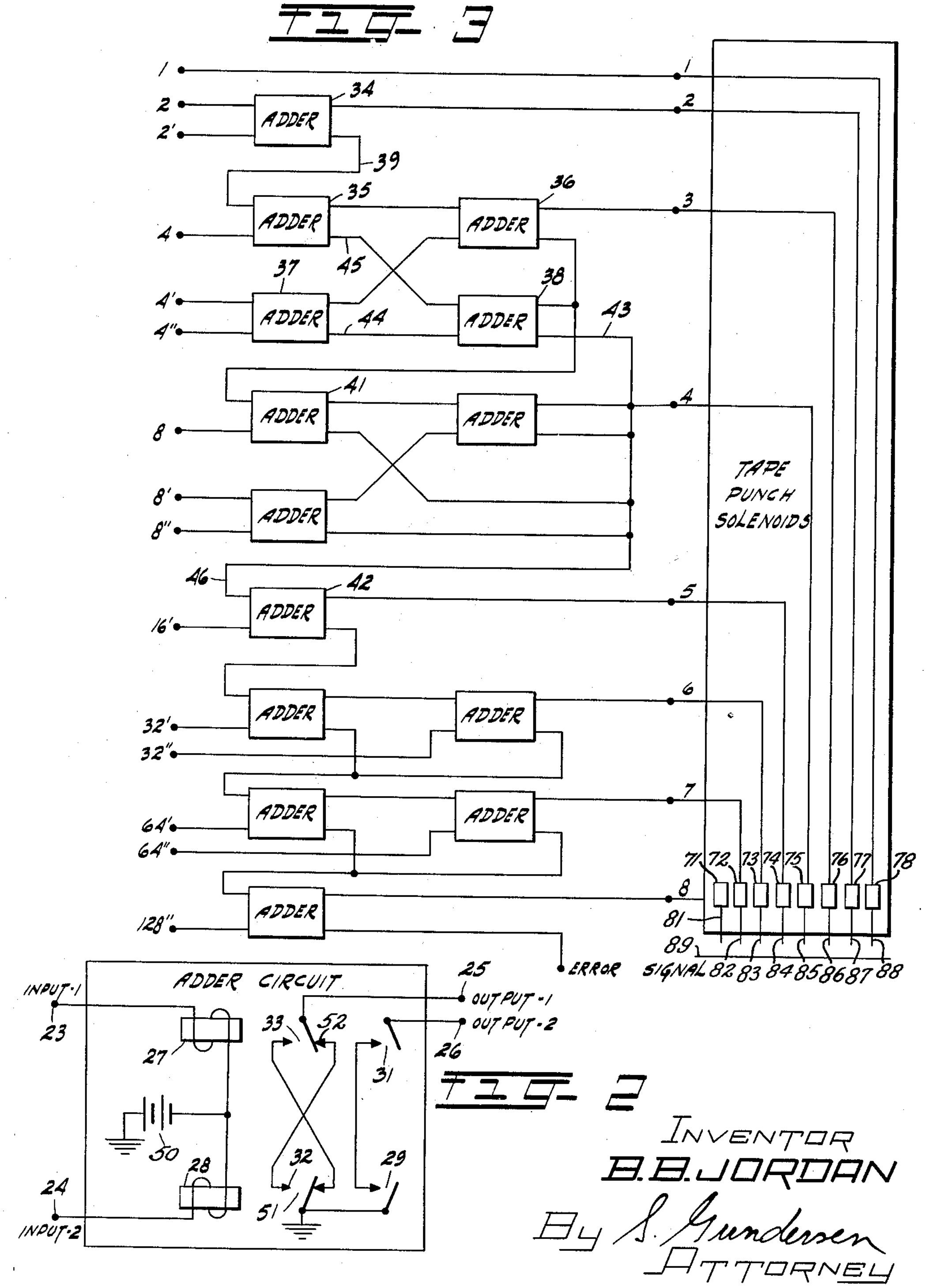
FIG. 2 is an electrical schematic diagram of one portion of the binary half-adder.
FIG. 3 is a block diagram of the binary half-adder.

FIG. 2 shows the basic binary half-adder, including a power source 50 and electrical input points 23 and 24. Without an electrical potential applied to either point 23 or point 24 there is no electrical output at sum output point 25 and carry output point 26. With an electrical input at point 23, relay 27 operates placing an electrical output onto sum output 25. Likewise an electrical input at point 24 operates relay 28 and places an output onto 25. Operation of relay 27, without operation of relay 28, does not put an electrical output to carry output 26 as normally open contact 29 remains open. With simultaneous inputs at both points 23 and 24, both relays 27 and 28 operate, normally open relay contacts 32, 33, 29 and 31 close and relay normally closed relay contacts 51 and 52 open, resulting in no output at sum output point 25 and an output at carry output point 26. Binary addition is possible by this simple half-adder circuit. For example, if points 23 and 24 are connected to different contacts in column 2 of the keyboard of FIGURE 1 a pulse from that column (representing the decimal number 2) would operate at either point 23 or point 24 giving a sum at point 25 of one pulse. If two such pulses arrive, one at point 23 and one at point 24, carry output 26 will operate, operating the next higher input for the decimal number 4. The relays 27 and 28 operate upon depression of the "addition" switch on the keyboard.

FIG. 3 shows the various inputs from the keyboard of FIG. 1. The inputs 2, 2'; 4, 4', 4''; 8, 8', 8''; 16', 16'' are numbered in accordance with the corresponding decimal numbered terminals in FIG. 1 and each block (such as blocks 34, 35, 36, 37, 38 etc.) consists of the binary half-adder illustrated in FIG. 2. The two inputs of binary half-adder 35 are binary half-adder 34 (its sum output 39) and terminal 4. The sum output of half-adder 35 leads to an input of half-adder 36. The other input of half-adder 36 is from the sum output of half-adder 37. The two inputs into half-adder 37 are terminal 4' and terminal 4''. The inputs of binary half-adder 38 are the carry output of half-adder 35 and the carry output of half-adder 37. The carry output of half-adder 36 connects to an input of half-adder 41 (the half-adder for column 8). The carry output of half-adder 38 connects to the input of half-adder 42 (the half-adder for column 16) as carry output 43 (of half-adder 38) only operates if both carry output 44 (of half-adder 37) and carry output 45 (of half-adder 35) both operate.

Sum outputs 1 to 9, inclusive, are seen to be operatively connected to solenoids 72 through 78, inclusive, in the manner shown with each of such outputs shown functioning, when energized, to energize the solenoid connected thereto. Tape punches 81 through 88, inclusive, are reciprocatably mounted within the solenoids with each such punch functioning, upon the energization of the solenoid associated therewith by the corresponding sum output, to punch a hole in the portion of tape 89 located directly therebelow. Thus, it may be seen that depression of one or more keys of the standard decimal keyboard to indicate a decimal number will result, upon depression of the "addition" switch and resultant energization of the appropriate half-adder circuits of FIG. 3, in the automatic punching of holes at predetermined positions on the 8-position tape 89. The positions of such holes in the tape will, of course, be representative of the binary equivalent of such decimal number.

In operation, if the number 146 is desired to be converted into binary notation, the operator depresses keys 100, 40 and 6. Key 100 operates a contact connected to the 64'' terminal, a contact connected to the 32'' terminal, and a contact connected to the 4' terminal. Key 40 operates a contact connected to terminal 32' and a contact connected to terminal 8'. Key 6 operates a contact connected to terminal 4 and a contact connected to terminal 2. It will be noted that there are only two occasions in which contacts have been operated in the same column, namely two contacts in column 32 (from key 100 and key 40) and two contacts in column 4 (from key 100 and key 6). The binary number given by key 100 is 01100100, the binary number given by key 40 is 00101000, and the binary number given by the key 6 is 00000110. Binary addition adds the two 1's in column 32 and transposes it into a number one in column 64, and likewise adds the two 1's in column 4 and transposes into a number one in column 8. This positions two 1's in both the 8 and 64 columns which are added. A one is transposed to column 16 and a one is transposed to column 128. The final binary number as obtained by the binary addition circuit is 10010010 (equivalent to 128+16+2 or 146).

Holes are punched by the apparatus of the invention in appropriate positions on the tape indicative of this binary number as follows. Energization of sum output 2 results in energization of solenoid 77 and actuation of punch 87 associated therewith to punch a hole in the second position on the tape. Concurrent energization of sum outputs 5 and 8 results in energization of solenoids 74 and 71, respectively, and actuation of punches 84 and 87 associated therewith to punch holes in the fifth and eighth positions on the tape. Thus, the resultant tape configuration will consist of holes punched in the eighth, fifth and second tape positions, which tape configuration will indicate to suitable tape "reading" apparatus the binary number 10010010 and its decimal counterpart 146.

Modifications may be made in this invention without departing from the scope thereof, for example diodes may be used in the place of the relays of the binary half-adder.

What is claimed is:

1. In an apparatus for converting decimal numbers to binary numbers and wherein are included a plurality of keys displaying decimal notations and contacts representing the binary numbers corresponding to the decimal numbers of the keys and connected thereto, a half-adder circuit comprising a source of electrical current, first and second inputs and first and second outputs, first and second relays operated respectively by the first and second inputs and each including first, second, and third contacts and first and second armature means, the first armature means normally closing the second contacts and the second armature means normally opening the third contacts, and wherein the third contacts are connectable to the second output and the first and second contacts are connectable to the first output so that the second contact of the second relay is connected to the first contact of the first relay and the first contact of the second relay is connected to the second contact of the first relay, whereby a signal to either one of the inputs places a signal upon the first output and a signal to both inputs places a signal upon the second output.

2. Apparatus for converting, decimal numbers entered manually, into an eight-column punched tape in binary notations comprising twenty keys representing the decimal numbers 1 through 9, and the decimal numbers 10, 20, 30, 40, 50, 60, 70, 80, 90, and 100, a plurality of contacts occupying some of the positions in a mosaic of eight columns and twenty rows, each row associated with a different key and each column representing a binary digit, and the contacts corresponding in their position to the binary number equivalent to the number of each key, a plurality of binary half-adder circuits, each comprising a plurality of electro-magnetic relays connected so that sums are carried from the half-adder for a lower number to the half-adder for a higher number, and eight solenoid-operated punches controlled by the adders.

References Cited in the file of this patent

UNITED STATES PATENTS

| | | |
|---|---|---|
| 2,318,591 | Couffignal | May 11, 1943 |
| 2,364,540 | Luhn | Dec. 5, 1944 |
| 2,394,925 | Luhn | Feb. 12, 1946 |
| 2,528,394 | Sharpless et al. | Oct. 31, 1950 |
| 2,647,689 | Bowyer | Aug. 4, 1953 |
| 2,657,856 | Edwards | Nov. 3, 1953 |
| 2,741,427 | Drake | Apr. 10, 1956 |
| 2,756,823 | Laville et al. | July 31, 1956 |
| 2,932,816 | Stiefel et al. | Apr. 12, 1960 |
| 2,997,703 | Powell | Aug. 22, 1961 |